UNITED STATES PATENT OFFICE.

HERBERT WILLIAM BUTLER AND JOSEPH HORSNELL MAY, OF LONDON, ENGLAND, ASSIGNORS TO JOHN IRVING COURTENAY, OF LONDON, ENGLAND.

MANUFACTURE OF SPONGY-LEAD PLATES FOR SECONDARY BATTERIES.

SPECIFICATION forming part of Letters Patent No. 715,016, dated December 2, 1902.

Application filed January 2, 1901. Serial No. 41,882. (Specimens.)

*To all whom it may concern:*

Be it known that we, HERBERT WILLIAM BUTLER and JOSEPH HORSNELL MAY, subjects of the Queen of Great Britain and Ireland, and residents of 4 Great Winchester street, in the city of London, England, have invented certain new and useful Improvements in the Manufacture of Negative or Spongy-Lead Plates or Elements for Secondary Batteries or Electrical Accumulators, of which the following is a specification.

This invention has for its object to provide for secondary batteries or electrical accumulators negative pole-plates or spongy-lead elements or plates which have large capacity and which are less liable to deterioration, and consequently have a longer "life" than such elements or plates as hitherto manufactured.

We employ in the manufacture of negative-pole elements or plates a mixture of lead oxid (or lead oxids) and powdered carbon (preferably charcoal) or other suitable organic substance capable of being decomposed and oxidized by the action of an electric current, as hereinafter described.

Presuming that charcoal is employed in the mixture, a mixture of ten per cent., by volume, of powdered charcoal to ninety per cent., by volume, of lead oxid answers well in practice; but we do not limit ourselves to these proportions. The oxid of lead and carbon are made into a paste by admixture with a suitable solution, such as either of the solutions commonly used for mixing the paste or active material of secondary batteries or electrical accumulators of the pasted or Faure type, and the paste so made is spread on or applied to the grid or support, which can be done in the usual or any suitable way. When the paste so applied has sufficiently dried, the element or plate is placed in a "forming" solution, which may be one of the usual forming solutions, and an electrical current is passed through it, it being attached to the positive pole of the source of electricity, and thereby the carbon or the equivalent is oxidized and peroxid of lead is formed, the whole or any desired portion of the carbon or the equivalent being removed by the action of the said current, thus leaving a porous mass of peroxid of lead without any carbon or the like if it has all been oxidized or with some carbon if it has not all been oxidized. An electrical current is then passed through the plate or element in the reverse direction to that in which it was passed as aforesaid, (after changing the solution, if necessary,) and thereby the peroxid of lead is reduced to spongy-lead, and when the peroxid has been so reduced the plate or element is ready for use in a secondary battery or electrical accumulator. The solution may be changed at any time before or after the reversal of the current.

The following is an example of the manner in which the invention may be performed; but we do not limit ourselves to the details of this example:

We make a mixture of powdered charcoal and lead oxid consisting of ten per cent. of charcoal and ninety per cent. of lead oxid, (the parts being by volume,) and we form this into a pasty mass by the addition of a solution of dilute sulfuric acid, and we apply this paste to the grid or conducting-support, which may be done in the ordinary manner. We then allow the paste to dry, with or without the application of artificial heat, and we then place the element or plate in a forming solution, which may consist of dilute sulfuric acid only or dilute sulfuric acid containing some salt rich in oxygen, such as sodium nitrate, and connect it with the positive pole of a dynamo or other source of electricity, an element or plate made of plain sheet-lead being connected with the negative pole of the dynamo or other source of electricity. We pass a current of electricity having a density of about one ampere for one hundred square inches of surface of the element or plate through until the carbon has been sufficiently oxidized, which is indicated by the gas being liberated from the surface of the plate or element, the liberation of the gas being the more violent as the carbon becomes exhausted. If sulfuric acid has been used for the forming solution, it is not then necessary to exchange the solution; but if the forming solution has consisted of sulfuric acid mixed with a salt rich in oxygen, such as sodium nitrate, then we remove the solution and introduce another solution formed of dilute sulfuric acid, and we pass a similar current through, but in the reverse direction, until the mass is reduced to the condition of spongy lead, when the element or plate thus treated is ready for use as the negative pole plates or element in a secondary battery or electrical accumulator.

Although one plate has been mentioned here, in practice, of course, a number of plates would be treated in a similar manner and formed together.

We are aware that it has been before proposed to use carbon in the form of small particles added to the paste which is used in the manufacture of plates or elements for secondary batteries or electrical accumulators, and this invention does not consist in such addition, but in the subsequent removal (either wholly or partially) of the carbon or equivalent by oxidation by electric action, as hereinbefore described, and then the reduction of the porous mass thus formed to spongy lead by reversal of the electric current.

Having now particularly described and ascertained the nature of the said invention and in what manner the same is to be performed, we declare that what we claim is—

1. The process of producing negative pole-plates or spongy-lead plates or elements for secondary batteries, consisting in subjecting a paste of lead oxid and an organic substance capable of being oxidized by the action of the electric current, applied to a grid or support to the action of the electric current in a forming solution or solutions the said current being first applied while the element or plate to be formed is attached to the positive pole of the source of electricity so as to oxidize the organic substance or any desired portion thereof and convert the lead oxid into porous peroxid and then passing the electric current in a reverse direction to reduce the porous peroxid to spongy lead.

2. The process of producing negative pole-plates or spongy-lead plates or elements for secondary batteries, consisting in subjecting a paste of lead oxid and powdered carbon, applied to a grid or support, to the action of an electric current in a forming solution or solutions, the said current being first applied while the element or plate being formed is attached to the positive pole of the source of electricity so as to oxidize the carbon or any desired portion thereof and convert the lead oxid into porous peroxid and then passing the electric current in a reverse direction to reduce the porous peroxid to spongy lead.

In testimony whereof we have signed this specification in the presence of two subscribing witnesses.

HERBERT WILLIAM BUTLER.
JOSEPH HORSNELL MAY.

Witnesses:
WILLIAM GERALD REYNOLDS,
HENRY DENIS HOSKINS.